United States Patent
Gai et al.

(10) Patent No.: US 7,130,272 B1
(45) Date of Patent: Oct. 31, 2006

(54) METHOD AND APPARATUS FOR PERFORMING HIGH-SPEED TRAFFIC SHAPING

(75) Inventors: Silvano Gai, Vigliano d'Asti (IT); Thomas J. Edsall, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 51 days.

(21) Appl. No.: 11/074,261

(22) Filed: Mar. 7, 2005

Related U.S. Application Data (63) Continuation of application No. 09/560,499, filed on Apr. 27, 2000, now Pat. No. 6,904,014.

(51) Int. Cl.
*J04L 12/28* (2006.01)
(52) U.S. Cl. .................... 370/236; 370/395.4
(58) Field of Classification Search ............... None
See application file for complete search history.

(56) References Cited

U.S. PATENT DOCUMENTS

| | | | |
|---|---|---|---|
| 5,363,499 A | 11/1994 | Glass | |
| 5,649,110 A | 7/1997 | Ben-Nun et al. | |
| 5,740,230 A | 4/1998 | Vaudreuil | |
| 5,781,769 A | 7/1998 | Weber | |
| 5,818,815 A | 10/1998 | Carpentier et al. | |
| 5,842,040 A | 11/1998 | Hughes et al. | |
| 5,995,511 A | 11/1999 | Zhou et al. | |
| 5,996,018 A | 11/1999 | Duault et al. | |
| 5,999,435 A | 12/1999 | Henderson et al. | |
| 6,034,945 A | 3/2000 | Hughes et al. | |
| 6,075,769 A | 6/2000 | Ghanwani et al. | |
| 6,134,217 A | 10/2000 | Stiliadis et al. | |
| 6,188,698 B1 | 2/2001 | Galand et al. | |
| 6,212,182 B1 | 4/2001 | McKeown | |
| 6,262,989 B1 | 7/2001 | Gemar et al. | |
| 6,501,731 B1 | 12/2002 | Chong et al. | |
| 6,532,213 B1 | 3/2003 | Chiussi et al. | |
| 6,560,230 B1 | 5/2003 | Li et al. | |
| 6,658,002 B1 | 12/2003 | Ross et al. | |
| 6,904,014 B1 * | 6/2005 | Gai et al. ............ 370/230.1 |
| 6,950,400 B1 * | 9/2005 | Tran et al. .............. 370/236 |

OTHER PUBLICATIONS

Commited Access Rate, (c) 1992-1999, Cisco Systems, Inc., pp. 1-5.
Policing and Shaping Overview, Cisco Sytems, Inc., Jun. 3, 1999, pp. 1-11.

(Continued)

*Primary Examiner*—Doris H. To
*Assistant Examiner*—Phuongchau Ba Nguyen
(74) *Attorney, Agent, or Firm*—Cesari and McKenna LLP (57) ABSTRACT

A network traffic shaper for shapping transmission of network messages includes a system time generator for generating a system time, an arithmetic logic unit (ALU) for computing a transmission start time for each network message in response to the system time, and a retrieve time generator adapted to increment a retrieve time at a rate faster than the system time. As network messages are received, they are stored in a queue along with an associated transmission start time for each message. A forwarding trigger transmits a store network messages when its associated transmission start time matches the retrieve time. Alternately, a second transmission start time representing an excess bandwidth transmission start time may be computed for each network message. If excess bandwidth is detected, a message may be transmitted when its second transmission start time matches the retrieve time.

20 Claims, 6 Drawing Sheets

OTHER PUBLICATIONS

Building Consistent Quality of Service into the Network, http;//www..cisco.com/warp/public/674/6.html, Jul. 20, 1999, pp. 1-5.

Network Flow Management, http://www.cisco.com/warp/public/614/18.html., Cisco Systems, Inc., Mar. 19, 1999, pp. 1-9.

Nahrstedt, Klara, Token Bucket with Leaky Bucket Rate Control, http://www.courses.cs.uiuc,edu/-cs, Mar. 9, 1999, pp. 1-2.

Nahrstedt, Klara, Traffic Shaping, http://www.courses.cs.uiuc,edu/-cs, Mar. 9, 1999, p. 1.

* cited by examiner

METHOD AND APPARATUS FOR PERFORMING HIGH-SPEED TRAFFIC SHAPING

This application is a continuation of Gai et al., titled "Method and Apparatus for Performing High-Speed Traffic Shaping," application Ser. No. 09/560,499, filed Apr. 27, 2000, now issued as U.S. Pat. No. 6,904,014.

FIELD OF THE INVENTION

The present invention relates generally to the field of computer networks, and more specifically, to a mechanism for shaping network traffic flows at high speed.

BACKGROUND OF THE INVENTION

Enterprises, including businesses, governments and educational institutions, rely on computer networks to share and exchange information. A computer network typically comprises a plurality of entities interconnected by a communications media. An entity may consist of any device, such as a host or end station, that sources (i.e., transmits) and/or receives network messages over the communications media. A common type of computer network is a local area network ("LAN") which typically refers to a privately owned network within a single building or campus. In many instances, several LANs may be interconnected by point-to-point links, microwave transceivers, satellite hook-ups, etc. to form a wide area network ("WAN") or subnet that may span an entire city, country or continent. One or more intermediate network devices are often used to couple LANs together and allow the corresponding entities to exchange information. A bridge, for example, may be used to provide a "bridging" function between two or more LANs. Alternatively, a switch may be utilized to provide a "switching" function for transferring information between a plurality of LANs at higher speed. Typically, the bridge or switch is a computer that includes a plurality of ports, which may be coupled to the LANs. The switching function includes receiving data at a source port that originated from a sending entity, and transferring that data to at least one destination port for forwarding to a receiving entity.

Another intermediate network device is called a router. A router is often used to interconnect LANs executing different LAN standards and/or to provide higher level functionality than bridges or switches. To perform these tasks, a router, which also is a computer having a plurality of ports, typically examines the destination address and source address of messages passing through the router. Routers typically operate at the network layer of the communications protocol stack utilized by the network, such as the Internet Protocol (IP) layer of the Transmission Control Protocol/Internet Protocol (TCP/IP) Reference Model. Furthermore, if the LAN standards associated with the source entity and the destination entity are dissimilar (e.g., Ethernet and Token Ring), the router may also alter the format of the packet so that it may be received by the destination entity. Routers also execute one or more routing protocols or algorithms, which are used to determine the paths along which network messages are sent.

To interconnect dispersed computer networks and/or provide Internet connectivity, many organizations rely on the infrastructure and facilities of Internet Service Providers (ISPs) rather than purchase and configure this equipment themselves. ISPs typically own one or more backbone networks that are configured to provide high-speed connection to the Internet. To interconnect private networks that are geographically diverse, an organization may subscribe to one or more ISPs and couple each of its private networks to the ISPs' equipment. Recently, some ISPs have also begun offering web-hosting services. Here, the ISP provides one or more web servers having Internet connectivity to an organization wishing to establish a presence on the Internet or World Wide Web. The organization and ISP typically enter into a service level agreement (SLA) that includes one or more traffic specifiers guaranteeing a level of service from the ISP and/or placing limits on the amount of resources that the subscribing organization will consume for a given charge. For example, an organization may agree that the traffic from its web site will not exceed a certain bandwidth (e.g., 1 Mbps). The ISP then monitors the traffic from the organization's web site to ensure that it complies with the relevant traffic specifiers and is thus "in-profile". Traffic that exceeds the specifier (i.e., traffic that is "out-of-profile") may be policed (i.e., dropped) or shaped (i.e., held until the traffic returns to its specified rate). Alternatively, the out-of-profile traffic may be subject to an accounting change (i.e., charged a higher rate) or marked, but nonetheless allowed to proceed by the ISP. If there is congestion, the ISP may drop such marked traffic first in an effort to relieve the congestion.

The policing and/or shaping of network traffic is typically performed in software by one or more intermediate devices within the ISP's network, such as routers and switches executing the Internetwork Operating System (IOS®) from Cisco Systems, Inc. of San Jose, Calif. First, the intermediate device identifies network messages as belonging to a given traffic flow by examining 5 network and transport layer message parameters (e.g., source and destination IP addresses, source and destination Transmission Control Protocol (TCP) or User Datagram Protocol (UDP) port numbers and transport protocol). For web-hosting services, the ISP is most interested in IP source address and TCP/UDP source port, which are sufficient to associate the traffic flow with a specific web server and site. Based on this information, the software may perform a look-up to identify a corresponding SLA and traffic specifier that applies to this flow. The software also processes the traffic to determine whether it is in or out of profile. If the traffic is in-profile, the software directs the intermediate device to forward it. If the traffic is out-of-profile, the software directs the intermediate device to drop it, buffer it until it is in-profile, or mark it, as provided by the applicable traffic specifier.

With the explosive growth of the Internet and the World Wide Web, some ISPs have begun to host many hundreds of web sites, each generating hundreds if not thousands of traffic flows at any given time. Many ISPs have also started to install and run high-speed equipment, such as fiber optic transmission links and high-speed transmission protocols to boost the performance of their networks. Some equipment, for example, can support Gigabit transmission speeds. In particular, the Institute of Electrical and Electronics Engineers (IEEE) has started development on a new standard, the 802.3z standard, called "Gigabit" Ethernet. This standard is intended to support transmission speeds up to 1000 Mbps (i.e., 1 Gbps). The current software solutions for performing traffic shaping are becoming less efficient at performing their message processing tasks as transmission rates reach such high speeds. Accordingly, a need has arisen for traffic shaping solutions that are capable of operating efficiently at the high transmission speeds of current and future ISP equipment.

SUMMARY OF THE INVENTION

Briefly, the invention relates to a network traffic shaper that is designed to operate at high transmission speeds. The shaper is preferably implemented at an intermediate network device that includes a forwarding engine, one or more message buffers for temporarily storing messages that are to be forwarded, and a clock or timing circuit. The traffic shaper includes a traffic shaper table that stores data transmission rate information (e.g., bit rates associated with the anticipated traffic flows), an arithmetic logic unit (ALU), and a high-speed forwarding trigger mechanism that includes at least one time-searchable data structure or queue. The traffic shaper is in communicating relationship with the forwarding engine for receiving information regarding received messages, and to the timing circuit for receiving system time. Within the traffic shaper, the ALU is coupled to the traffic shaper table and the forwarding trigger. As messages are received at the intermediate device, they are stored at one of the message buffers. The forwarding engine examines each message and, for each message that is to be shaped, calculates certain message-related parameters and identifies a traffic specifier to be applied to the message.

This information is then provided to the traffic shaper along with the location of the message in the respective message buffer. The traffic shaper determines a time at which transmission of the message may start in accordance with the associated traffic specifier, and stores this transmission start time together with the message's buffer location in the time-searchable queue. The forwarding trigger runs a retrieve time counter that is allowed to equal but not exceed the system time and constantly compares this retrieve time with the transmission start times associated with messages stored in the time-searchable queue. When the transmission start time of a given message matches the retrieve time, the forwarding trigger causes the given message to be fetched from the buffer and forwarded from the intermediate network device. The configuration of the traffic shaper of the present invention, including the high-speed forwarding trigger mechanism, both of which are preferably implemented through integrated hardware components, allows messages to be processed at high rates of speed, including Gigabit per second transmission rates.

In a further aspect of the invention, the intermediate network device may also include a flow management mechanism or component for determining whether excess bandwidth exists at the intermediate device. The flow management mechanism preferably provides this information to the trigger mechanism on an on-going basis. In this embodiment, the ALU is configured to calculate two transmission start times for certain messages: a guaranteed transmission start time and an excess bandwidth transmission start time, which is earlier than the guaranteed transmission time. These two start times are then stored in the time-searchable queue for the respective message. When excess bandwidth is present, the forwarding trigger searches the queue for entries whose excess bandwidth transmission start time matches the retrieve time. Upon locating such entries, the forwarding trigger causes the given message to be fetched from the buffer and forwarded. If there is no excess bandwidth, the forwarding trigger instead waits until the retrieve time equals or exceeds the guaranteed transmission time before causing the given message to be forwarded.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
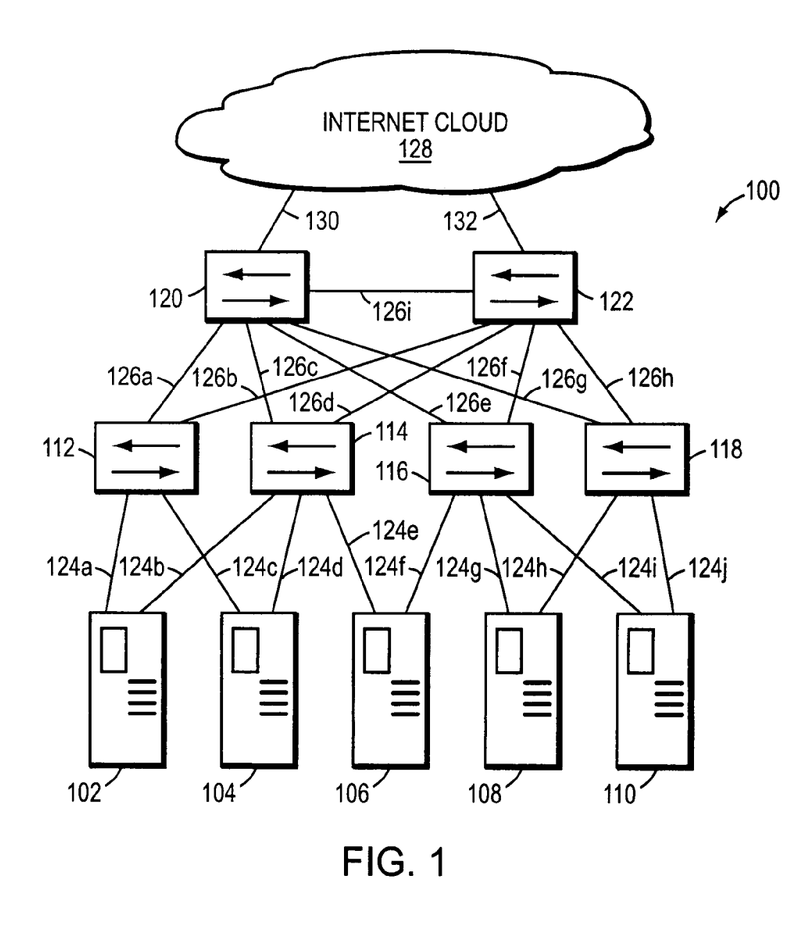
FIG. 1 is a highly schematic block diagram of a computer network.

FIG. 1 is a highly schematic illustration of a computer network 100. The network 100 includes a plurality of servers 102–110 that are preferably configured as web-hosting servers. The network 100 further includes a plurality of intermediate network devices 112–122, such as backbone routers, high-speed switches, etc. Each web server 102–110 is preferably coupled to two or more of the devices 112–122 by respective trunks or links 124a–j. Server 102, for example, is coupled to device 112 by link 124a, and to device 114 by link 124b. The devices 112–122 are similarly interconnected with each other by another set of trunks or links 126a–i. Significantly, the network 100 is also coupled to the well-known Internet, which may be represented by an Internet cloud 128. In particular, device 120 is coupled to the Internet 128 by link 130, and device 122 is coupled to the Internet by link 132. Accordingly, network 100 allows users (not shown) coupled to Internet cloud 128 through other networks or connections to access any of the web servers 102–110 and retrieve information posted on those servers 102–110.

It should be understood that the configuration of network 100 is meant for illustrative purposes only, and that the present invention will operate with other, possibly far more complex, network designs or topologies.

Figure 2:
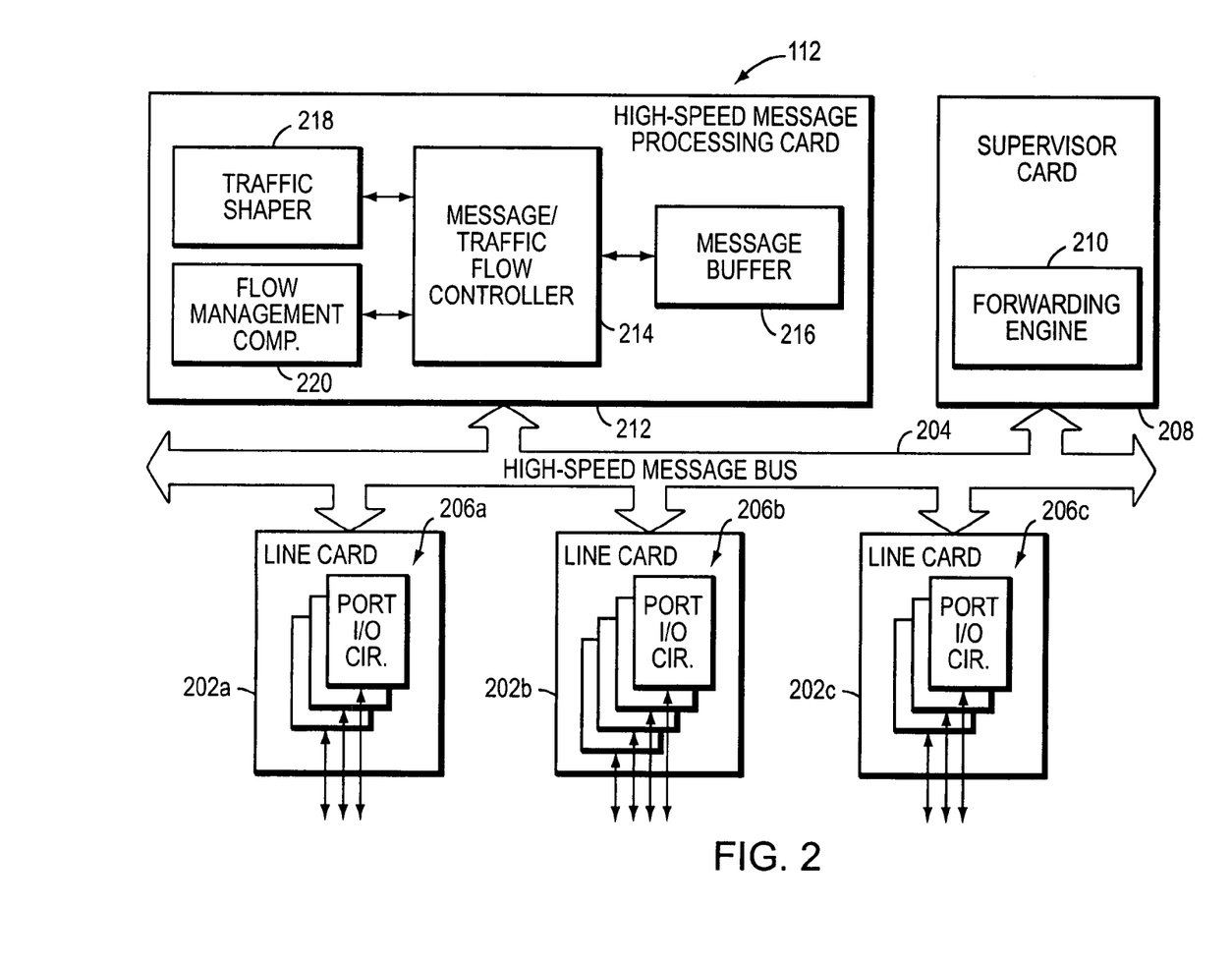
FIG. 2 is a partial functional block diagram of an intermediate network device including a traffic shaper of the present invention.

FIG. 2 is a highly schematic, partial functional diagram of intermediate network device 112. Device 112 includes a plurality of line cards 202a–202c that are coupled to a high-performance switching bus 204. Each line card 202a–202c, moreover, has a plurality of corresponding port input/output (I/O) circuits 206a–206c, respectively, that are each coupled to respective ports (not shown), thereby connecting device 112 to the entities of network 100 (FIG. 1). The port I/O circuits 206 cooperate with their respective line cards 202a–c to efficiently transmit data to, and receive data from, the switching bus 204. In particular, communication among the various ports or cards occurs synchronously over the switching bus 204 using periodic bus cycles. The switching bus 204, which includes corresponding address and control busses, is preferably a 256-bit bus having a bus cycle of 16 nanoseconds (62.5 Mhz) and an effective data rate of 16 Gigabits per second (Gb/s). Also coupled to switching bus 204 are one or more supervisor cards, such as supervisor card 208, having a forwarding engine 210. The forwarding engine 210 executes forwarding decisions for network messages placed onto the bus 204 and selects one or more destination ports (e.g., port I/O circuits 206) for forwarding those messages.

Each line card 202a–202c also includes its own message buffer (not shown) for temporarily storing messages traversing the bus 204. In addition, a respective buffer circuit (not shown) may be used to connect each line card 202a–c to the switching bus 204. This buffer circuit may be located on the switching bus 204 and provide a single clock (i.e., 40 nanoseconds) delay between the bus 204 and each port on the card 202a–c. Such clock cycle delay maintains proper bus loading so that data transmitted from the ports can be properly driven onto the bus 204.

In addition to the supervisor card 208, device 112 further includes a high-speed message processing card 212 that is similarly coupled to the bus 204. Message processing card 212 preferably includes a message/traffic flow controller 214, a message buffer 216, a traffic shaper 218 and a flow management component 220. The controller 214 includes a clock circuit (not shown) for generating time information. The traffic shaper is 218, flow management component 220 and message buffer 216 are each coupled to the message/traffic flow controller 214. In the preferred embodiment, traffic shaper 218 receives and processes pointers to messages temporarily stored at buffer 216.

Suitable intermediate network device platforms for use with the present invention include the commercially available Catalyst 5000 and 6000 series of switches from Cisco Systems, Inc., as well as the intermediate network device described in U.S. patent application Ser. No. 08/623,142, filed Mar. 28, 1996, for INTERSWITCH LINK MECHANISM FOR CONNECTING HIGH-PERFORMANCE NETWORK SWITCHES, which issued as U.S. Pat. No. 5,742,604, and is hereby incorporated by reference in its entirety.

Figure 3:
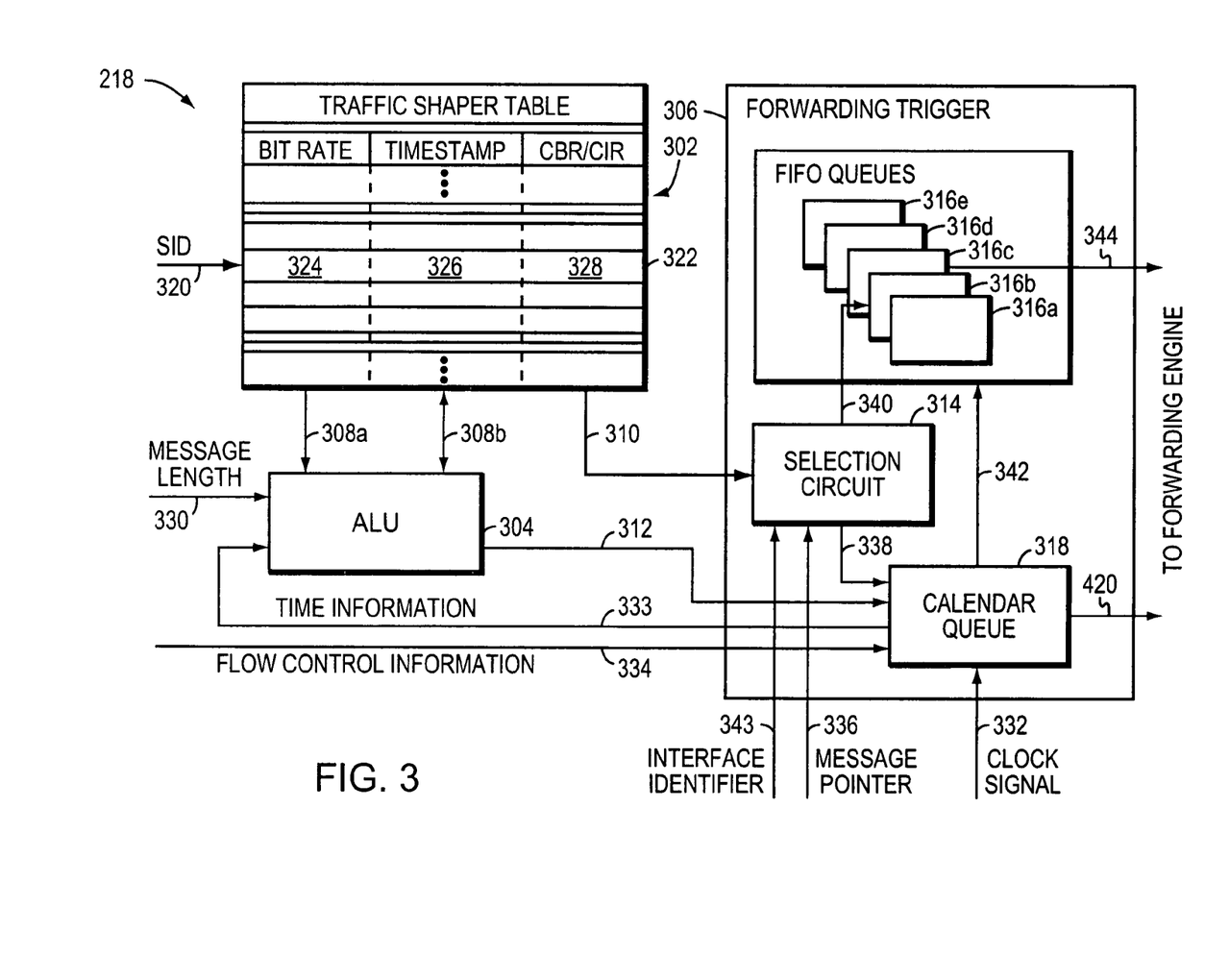
FIG. 3 is a functional block diagram of the traffic shaper of FIG. 2.

FIG. 3 is a highly schematic block diagram of the traffic shaper 218 of FIG. 2. The traffic shaper 218 includes a traffic shaper table 302, an arithmetic logic unit (ALU) 304, and a high-speed forwarding trigger mechanism 306. The ALU 304, which is configured to compute one or more transmission start times for each designated message, is coupled to the traffic shaper table 302, as shown by arrows 308a and 308b. Both the traffic shaper table 302 and the ALU 304 are coupled to the forwarding trigger mechanism 306, as shown by arrows 310 and 312, respectively. The traffic shaper table 302 may be preconfigured with data transmission rate information for the traffic flows for which the shaper 218 is responsible. In particular, traffic shaper table 302 may be arranged as an array having a plurality of rows or records (e.g., 32k). Each row of the array has a first field containing at least one data transmission or bit rate (e.g., in bits per second). Each row also has a second field for storing a timestamp that relates to the time that the last message was transmitted at the respective bit rate. Each row may further include a third field for use in signifying whether the row contains a single data transmission rate for performing constant bit rate (CBR) traffic shaping, or two data transmission rates for performing committed information rate/excess information rate (CIR/EIR) traffic shaping.

CBR traffic shaping means that the transmission rate of the respective traffic must not exceed the CBR transmission rate. If messages are received at a rate greater than the rate at which they can be transmitted to remain within the CBR, these additional messages are buffered for later transmission. If the buffer fills, subsequently received messages may be dropped. Although CBR is a relatively straightforward technique, it can be too strict in situations where excess bandwidth may exist. With CIR/EIR traffic shaping, the system guarantees to send the respective traffic at the CIR transmission rate. However, if excess bandwidth exists, the traffic may be sent at the EIR transmission rate which is better (i.e., faster) than the associated CIR rate. If excess bandwidth does not exist, the traffic is simply sent at the guaranteed CIR rate.

The forwarding trigger mechanism 306 includes a plurality of sub-components. In particular, it includes a selection circuit 314, a plurality of first-in-first-out (FIFO) queues 316a–e and a time-searchable queue, such as calendar queue 318. The selection circuit 314 is coupled to receive control information from the traffic shaper table 302, and also to the FIFO queues 316 and the calendar queue 318 for loading or storing information therein. As described below, the FIFO queues 316 are used to implement CIR/EIR traffic shaping, and the calendar queue 318 contains the transmission start times computed by the ALU 304 and determines when a given message may be transmitted by the respective intermediate device, e.g., device 112 (FIG. 2).

Additionally, the traffic shaper table 302, the ALU 304 and the trigger mechanism 306 are also coupled to the message/traffic flow controller 214 (FIG. 2) to receive specific information therefrom. This information may originate from controller 214 or from the forwarding engine 210. In particular, the traffic shaper table 302 is configured to receive a shaper identification (SID), as indicated by arrow 320, for received messages. A SID basically represents the data transmission or bit rate at which the respective message is to be sent. The SID is typically derived by the forwarding engine 210 from one or more traffic specifiers in the service level agreement for the respective message/traffic flow. Each SID also identifies, preferably uniquely, a particular row or record, such as row 322, within table 302. As described above, the row 322, moreover, includes a first field 324 containing one or more data transmission or bit rates, a second field 326 containing one or more last message sent timestamp(s), and a third field 328 signifying whether the respective data transmission rate is for CBR traffic shaping or CIR/EIR traffic shaping.

Message length information, preferably from the forwarding engine 210 (FIG. 2), is provided to the ALU 304, as indicated by arrow 330, and a high frequency clock signal, e.g., a 100 MHz square wave, is provided to the calendar queue 318, as represented by arrow 332. Calendar queue 318 utilizes this clock signal to operate a system time generator as described below. This system time information is provided by calendar queue 318 to the ALU through a communication mechanism represented by arrow 333. The ALU 304 uses this length and time information to compute a time at which transmission of the respective message may start in compliance with the SID. This transmission start time is provided to the calendar queue 318 by the communication mechanism represented by arrow 312. The calendar queue 318 also receives flow control information from the message/traffic flow controller 214, as shown by arrow 334. This flow control information may be derived by controller 214 in cooperation with the flow management component 220. The flow control information basically informs the calendar queue 318 whether excess bandwidth exists for sending network messages from the respective device, e.g., device 112. The controller 214 also provides a message pointer to the selection circuit 314 of the forwarding trigger mechanism 306, as indicated by arrow 336. The message pointer specifies the particular location in the message buffer 216 at which the respective message is stored.

The selection circuit 314 of the forwarding trigger 306 is configured and arranged to supply the message pointer information either to the calendar queue 318 or to the FIFO queues 316, as shown by arrows 338 and 340, respectively, depending on the type of traffic shaping to be applied as specified by table 302 via arrow 310. In addition, the calendar queue 318 is coupled to the FIFO queues 316, as shown by arrow 342. Selection circuit 314 may further receive interface identifier information from controller 214 through a communication mechanism represented by arrow 343. As described below, circuit 314 may utilize this interface information to select a particular FIFO queue 316.

Figure 4:
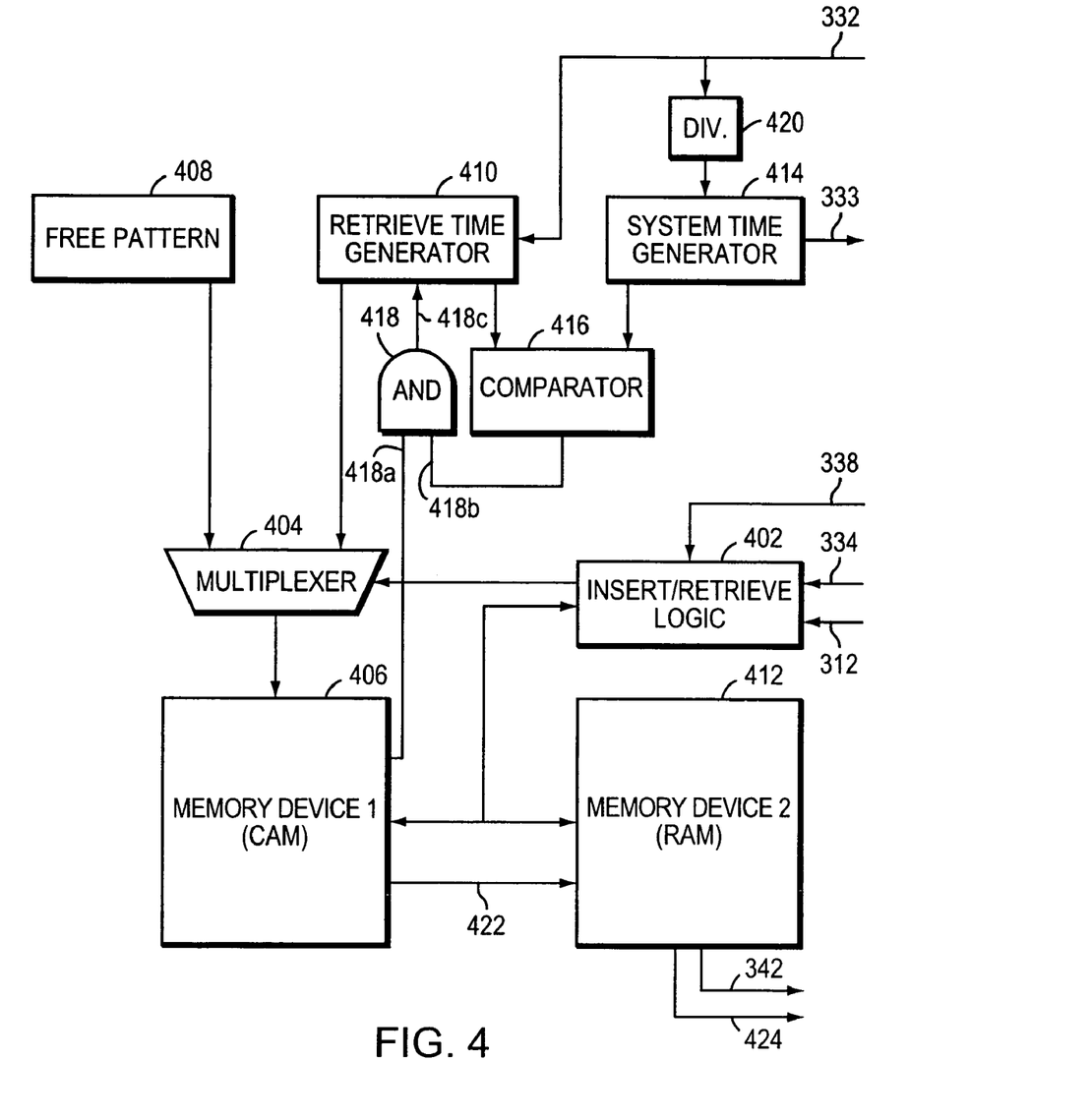
FIG. 4 is a functional block diagram of the time-searchable queue of the present invention.

FIG. 4 is a functional block diagram of the calendar queue 318. The calendar queue 318 includes insert/retrieve logic 402 that is operatively coupled to control a multiplexer 404 having an output coupled to a first memory device 406. The multiplexer 404 is configured to receive inputs from a free pattern data structure 408 and a retrieve time generator 410. The calendar queue 318 further includes a second memory device 412, that is related to the first memory device 406, and a system time generator 414. The insert/retrieve logic 402, in addition to controlling the multiplexer 404, is also coupled to both the first and second memory devices 406, 412 for storing information in the respective entries thereof, and also for retrieving information and outputs therefrom. The calendar queue 318 also includes a comparator 416 and Boolean logic configured as, e.g., an AND gate 418. The comparator 416 receives inputs from the retrieve time generator 410 and the system time generator 414. The AND gate 418 has two inputs 418a and 418b and one output 418c. The first input 418a is coupled to the first memory device 406, while the second input 418b is coupled to an output of the comparator 416. The output 418c of the AND gate 418 is coupled to the retrieve time generator 410.

As described above, the calendar queue 318 receives various information from the other components of the forwarding trigger 306, the traffic shaper 218 and the message/traffic flow controller 214 (FIG. 2). In particular, a clock signal is provided as represented by arrow 332 to both the retrieve time generator 410 and the system time generator 414 for use in operating (e.g., incrementing) those generators. A divider circuit 420 is preferably interposed between the clock signal 332 and the system time generator 414 to alter the rate at which the system time generator 414 is advanced. For example, the divider circuit 420 may modify the clock signal 332 (e.g., 100 MHz) so that the resolution or granularity of the system time generator 414 is 100 nanoseconds (nsec). System time as determined by generator 414, moreover, is preferably provided to the ALU 304 (FIG. 3) as indicated by arrow 333. Retrieve and system time generators 410, 414 may each include a 32-bit register for storing their respective times.

The flow control information from arrow 312 is received at the insert/retrieve logic 402. Communication signals from the selection circuit 314 (FIG. 3), as represented by arrow 338, are received at the insert/retrieve logic 402, and information from the second memory device 412 may be provided to the FIFO queues 316 (FIG. 2) as indicated by arrow 342.

In the preferred embodiment, the traffic shaper of the present invention is implemented in hardware through a plurality of registers and combinational logic configured to produce sequential logic circuits and cooperating state machines. For example, the first memory device 406 is preferably implemented via an associative memory or content addressable memory (CAM) device, such as a ternary content addressable memory (TCAM), whose cells (not shown) may be associated with or assigned one of three values, such as "0", "1" or "don't care". Suitable TCAMs for use with the present invention are commercially available from NetLogic Microsystems, Inc. of Mountain View, Calif. and Music Semiconductors of Hackettstown, N.J. A preferred TCAM has 512K rows of 72 bit length. To implement the "don't care" value, the TCAM 406 may be segregated into blocks of cells (each cell being either asserted or de-asserted) such that each block has a corresponding mask that determines whether the respective cells of its block are "care" or "don't care". It should also be understood that one or more binary CAMs may be used. The second memory device 412 is preferably implemented via a static or dynamic random access memory (RAM) structure. Those skilled in the art will recognize that other combinations of hardware components in addition to those specifically described herein may be advantageously utilized to achieve the objectives of the present invention.

Operation of the traffic shaper 218 of the present invention proceeds as follows. Suppose web server 102 (FIG. 1) hosts a plurality of websites, and that a user coupled to the Internet cloud 128 connects to one of these sites (e.g., website "ABC") and requests information. Suppose further that the ISP running network 100 and the owner of website "ABC" have entered into a service level agreement (SLA) in which the ISP guarantees a particular data transmission rate (e.g., 1 Mbps) and website "ABC" agrees not to exceed that rate. In response to the user connection, the website "ABC" generates one or more network messages for transmission to the user. These network messages are then handed to conventional network communications facilities (not shown) at the web server 102 where they are encapsulated into one or more packets and/or frames, such as Transmission Control Protocol/Internet Protocol (TCP/IP) packets. These packets are then transmitted across link 124a and received at device 112. At device 112, the packets are initially captured by the port I/O circuit 206 that is coupled to link 124a. The respective line card, e.g., card 202a, then drives the packets onto the high-speed bus 204. From here, the packets are received by the other line cards 202b and 202c, the message processing card 212 and the supervisor card 210. Message processing card 212 temporarily stores the packets in its message buffer 216 as do the other line cards 202b and 202c, while forwarding engine 210 executes a forwarding decision.

In general, forwarding engine 210 examines one or more fields of the packet (e.g., source and destination IP addresses, source and destination TCP/UDP port numbers, transport protocol, etc.) and determines whether the packet should be shaped. Since the packet originated from website "ABC" at web server 102, which is subject to an SLA, forwarding engine 210 concludes that it should be shaped. Accordingly, the forwarding engine 210 identifies the shaper identification (SID) to which such packets are subject under the terms of the SLA, and provides the SID along with other packet-related information, as described below, to the message processing card 212 for forwarding to the traffic shaper 218. Shaper 218, in turn, calculates when the packet may be sent in compliance with the SID. The other line cards 202b and 202c simply discard the packet from their message buffers. When the calculated transmission start time is reached, the traffic shaper 218 notifies the message/traffic flow controller 214 which retrieves the packet from the message buffer 216 and places it once again on the bus 204 where it is received by all of line cards 202a–c and stored in their respective message buffers. The packet is also received by the forwarding engine 210 of the supervisor card. Since the packet originated from the message processing card 212, rather than a line card 202, the forwarding engine 210 "knows" that it has already been shaped. Accordingly, this time the forwarding engine 210 determines the line card 202 and port I/O circuit 206 from which the packet should be forwarded, based on the packet's destination address, and instructs this line card and port I/O circuit to forward the packet. The other line cards 202 simply discard the packet from their buffers.

As described herein, one of the key attributes of the novel traffic shaper 218 of the present invention is its ability to render such per-packet transmission time calculations fast enough to support Gigabit transmission speeds by forwarding engine 210 and intermediate device 112, despite the fact that messages may traverse bus 204 twice.

To determine the SID, forwarding engine 210 may perform a look-up on a memory structure (not shown) that associates messages (e.g., by IP source address and TCP/UDP source port) with their corresponding SIDs. The identified SID is then passed to the message processing card 212 and handed to the traffic shaper 218 by the controller 214 as indicated by arrow 320 (FIG. 3). Forwarding engine 210 or controller 214 also determines the length of the message (e.g., in bits or octets) and provides this information to the traffic shaper 218 as indicated by arrow 330. Controller 214 also hands the traffic shaper 218 a pointer as indicated by arrow 336 that identifies where in message buffer 216 the respective message has been temporarily stored. The SID, message length and message pointer for a given message are all preferably provided to the traffic shaper 218 at substantially the same time (e.g., in parallel), thereby allowing shaper 28 to coordinate this information for each message.

The SID from forwarding engine 210 is used by the traffic shaper 218 to identify a particular row or record (e.g., row 322) of traffic shaper table 302. The data transmission rate(s) and timestamp(s) contained in the corresponding fields 324 and 326 of this row 322 are then provided to the ALU 304 as indicated by arrows 308a and 308b. Using this information, together with the message length received via arrow 330, the ALU 304 computes one or more transmission start times. That is, based on the length of the message from arrow 330, the transmission rate from arrow 308a and the last time a message was sent at this transmission rate from arrow 308b, the ALU 304 can compute when this message may be sent in compliance with the identified transmission rate. If two or more bit rates are provided to the ALU 304 via arrow 308a (e.g., in the case of CIR/EIR traffic shaping), the ALU 304 calculates a transmission start time for each such bit rate. The one or more transmission start times, which may be 32-bit values like the corresponding time registers operated by generators 410 and 414 (FIG. 4), are then provided by the ALU 304 to the calendar queue 318 via arrow 312. The ALU 304 also returns the computed transmission start time(s) to the traffic shaper table 302 for up-dating (i.e., re-writing) the last message sent timestamp field 326 of the respective SID, as indicated by arrow 308b. It should be understood that ALU 304 may also store message length in table 302 (in its own field or column).

In a preferred embodiment, rather than containing one or more bit rates, first field 324 of the identified record contains information for use in implementing a token bucket mechanism. Token bucket refers to a packet transfer technology that accommodates burstiness. Conceptually, one or more tokens are required to forward network messages. Tokens are acquired at a certain rate and are placed in a "bucket". Once the bucket is full, any additional tokens are simply discarded. As traffic is received, if sufficient tokens are present in the bucket, the traffic may be forwarded, causing the requisite number of tokens to be "consumed". If insufficient tokens are present, the traffic must be delayed (i.e., placed in a buffer) until more tokens are received. Thus, the token bucket scheme accommodates burstiness, but ensures that the long-term transmission rate does not exceed the established rate at which tokens are placed in the bucket. The three parameters used to set-up a token bucket scheme are burst size, mean rate and measurement (or time) interval. Thus field 324, which may be divided into one or more sub-fields, is preferably configured to contain this information.

The information contained in field 328 of the identified row 322 specifying whether the SID calls for CBR or CIR/EIR traffic shaping is provided to the selection circuit 314 via arrow 310. The selection circuit 314 uses this information to determine whether the message pointer received via arrow 336 should be stored in the FIFO queues 316 or in the calendar queue 318. In particular, if CBR traffic shaping is requested as reflected by the contents of field 328, the selection circuit 314 passes the message pointer to the calendar queue 318 for storage, whereas if CIR/EIR traffic shaping is requested, the selection circuit 314 places the message pointer in one of the FIFO queues (e.g., FIFO queue 316b) and supplies the calendar queue 318 with the identity of the selected FIFO queue 316b. At FIFO queue 316b, the message pointer is placed at the end of the queue.

In one embodiment, the FIFO queues 316 of the forwarding trigger 306 are associated with different levels of service. For example, each FIFO queue may be associated with a differentiated service (DS) codepoint, as defined by a working group of the Internet Engineering Task Force (IETF) in a document entitled An Architecture for Differentiated Services. Messages carry a particular DS codepoint in order to specify the per-hop behavior (e.g., expedited forwarding, assured forwarding, etc.) that is to be applied to the message. Since the IETF plans to define 64 DS codepoints, forwarding trigger 306 preferably includes 64 FIFO queues 316, one per DS codepoint.

In another embodiment, the forwarding trigger 306 has at least one, but preferably two or more, FIFO queues for each network layer (e.g., IP) interface configured at the corresponding intermediate device, e.g., device 112. For example, for each interface, there may be one FIFO queue per Service Level Agreement (SLA). An interface basically represents the logical communication path between adjacent layers of a communication protocol stack, such as the IP and data link layers of the TCP/IP Reference Model. See A. Tanenbaum *Computer Networks* (3rd ed. 1996) at pp. 17–37 for a general description of interfaces. The selection circuit 314 preferably places the message pointer in the FIFO queue that corresponds to the interface and SLA from which the respective message will be sent, as determined by the forwarding engine 210. Circuit 314 may learn of the appropriate FIFO queue through the interface/SLA identifier information received from the flow controller 214 (FIG. 2) as represented by arrow 343.

Nonetheless, it is the calendar queue 318 of the forwarding trigger 306 that permits the transmission start times of network messages to be stored, searched and identified on a high-speed basis. In particular, the insert/retrieve logic 402 receives either the single transmission start time for CBR traffic shaping or two transmission start times for CIR/EIR traffic shaping via arrow 312. Insert/retrieve logic 402 also receives message pointer information (i.e., either the actual message pointer or the identity of the FIFO queue 316 containing the actual message pointer) from the selection circuit 314. In response to receiving such information, the insert/retrieve logic 402 sets the multiplexer 404 to search TCAM 406 for the first instance of the free pattern as identified from free pattern data structure 408 (i.e., calendar queue 318 is operating in "insert" mode). Preferably, the TCAM 406 is initially configured so that every entry corresponds to the free pattern (e.g., 1000 . . . 000). As data is loaded into the TCAM 406, the values of the corresponding entries will no longer match the free pattern indicating that these entries now contain data and should not be overwritten.

With the input to the TCAM 406 set to the free pattern 408, it preferably returns the first entry that matches the free pattern. So as to provide greater storage capacity than otherwise possible with currently available TCAMs, the output of each TCAM entry is preferably configured to identify a particular entry or location in the second memory device 412, as represented by arrow 422. The insert/retrieve logic 402 stores the received information for the respective message in the identified entry of the first and second memories 406, 412. In particular, the insert/retrieve logic 402 stores the tuple {Pointer, First Timestamp, Second Timestamp}, where Pointer corresponds to the message pointer information (i.e., a location in buffer 216 or the identity of a particular FIFO queue 316), and the First and Second Timestamps correspond to the computed transmission start times for the corresponding message. In particular, for CBR traffic shaping, both the First and Second Timestamps are set to the single computed transmission start time. For CIR/EIR traffic shaping, the First Timestamp is set to the CIR computed transmission start time and the Second Timestamp is set to the EIR computed transmission start time. The two timestamps are stored in the free entry of the TCAM 406 and the message pointer information is stored in the corresponding entry of the RAM 412. The calendar queue 318 repeats this process for each network message to be shaped, loading up the free entries of the TCAM 406 with the two transmission start times and the matching entries of the RAM 412 with the corresponding message pointer information.

It should be understood that the combination of TCAM 406 and RAM 412 could be replaced with just one TCAM (or several TCAMs) of sufficient width to additionally store the information otherwise held by RAM 412.

In addition to loading the first and second memory devices 406 and 412 with message transmission and location information, the calendar queue 318 also searches the first memory device 406 for messages that may be transmitted based on their transmission start times. To identify messages that may be sent, the calendar queue 318 preferably uses the retrieve time generator 410, rather than making transmission decisions based solely on the system time. In particular, the calendar queue 318 searches the TCAM 406 for messages whose transmission start time matches the current retrieve time as determined by the retrieve time generator 410. To set the TCAM 406 to search for messages as opposed to locating free entries, the insert/retrieve logic 402 preferably couples the output of the multiplexer 404 to the retrieve time generator 410 (i.e., calendar queue 318 is operating in "retrieve" mode).

In retrieve mode, the TCAM 406 is searched for all entries having a transmission start time that matches the value of the retrieve time generator 410. When such an entry is found, the calendar queue 306 triggers the message/traffic flow controller 214 to fetch the message from buffer 216 as identified by the location information from the corresponding entry in the second memory device 412, and place the message on bus 204. More specifically, the insert/retrieve logic 402 first determines whether or not excess bandwidth exists for the transmission of messages. Insert/retrieve logic 402 preferably receives this information from the controller 214 via arrow 334. If excess bandwidth exists, the insert/retrieve logic 402 searches the TCAM 406 for all entries whose Second Timestamp value matches the retrieve time. When such an entry is found, the insert/retrieve logic 402 determines whether the information from the corresponding entry in the RAM 412 is a pointer to a location in the message buffer 216 (FIG. 2) or to one of the FIFO queues 316. If the information is a pointer to message buffer 216, then the calendar queue 318 "knows" that CBR traffic shaping was implemented for this message. In response, the calendar queue 318 issues a transmit trigger-signal to the message/traffic flow controller 214, as indicated by arrow 424 from RAM 412. This transmit trigger-signal includes the pointer to message buffer 216. The controller 214, in turn, retrieves the identified message from buffer 216 (using the pointer returned by the traffic shaper 218) and places the message on the high-speed bus 204 for forwarding by the appropriate destination port, as determined by the forwarding engine 210.

If the information from the corresponding location in RAM 412 identifies one of the FIFO queues 316, then the calendar queue 318 "knows" that CIR/EIR traffic shaping was requested. In response, the calendar queue 318 accesses the identified FIFO queue (e.g., FIFO queue 316c), as indicated by arrow 342, and directs queue 316c to issue a transmit trigger-signal to the message/traffic flow controller 214, as shown by arrow 344 (FIG. 3). This transmit trigger-signal includes the pointer stored at the head of queue 316c which identifies the next message to be sent from that queue. The controller 214 similarly retrieves the identified message from buffer 216 and places the message on the high-speed bus 204 for forwarding by the appropriate destination port. Queue 316c then deletes (i.e., de-queues) this entry and advances all of the remaining pointers.

The searching of the TCAM 406 continues for all entries whose Second Timestamps match the current value of the retrieve time generator 410. For each matching entry, the TCAM 406 identifies a corresponding location in the RAM 412 as reflected by arrow 422, and the calendar queue 318 uses the contents of this memory location to issue a transmit trigger-signal to the controller 214. Upon identifying each matching entry and identifying its corresponding location in the second memory device 412, the entry at TCAM 406 is re-set to the free pattern so that it may be re-used by the insert/retrieve logic 402 during insert mode. This process continues until all TCAM entries matching the current value of the retrieve time generator 410 have been located and processed or until the insert/retrieve logic 402 receives an indication, via arrow 334, that excess bandwidth no longer exits.

If there is no excess bandwidth, the insert/retrieve logic 402 searches the TCAM 406 for entries whose First Timestamp matches the current retrieve time. As each matching entry is identified, the corresponding message information from the RAM 412 is similarly accessed and a transmit trigger-signal is issued to the message/traffic flow controller 214. To switch searching the TCAM 406 between the First Timestamp entry and the Second Timestamp entry (i.e., between different columns), the insert/retrieve ogic 402 preferably employs one or more Global Mask Registers (GMRs). Each GMR asks the fields from one or more columns (i.e., the First Timestamp column or the Secnd Timestamp column).

The insert/retrieve logic 402 is preferably configured to give precedence to the loading or inserting of new information in the first and second memory devices 406, 412. Thus, only if there is no data to store does the insert/retrieve logic 402 switch to retrieve mode.

Those skilled in the art will understand that other search techniques may be implemented or utilized at the first memory device 406.

As mentioned above, the calendar queue 318 is configured to ensure that the value of the retrieve time generator 410 never exceeds the system time. In addition, the retrieve time generator 410 is blocked from incrementing while matching entries in the first memory device 406 are being located and processed. This operating characteristic is achieved through the combined operation of AND gate 418 and comparator 416. More specifically, the retrieve time generator 410 is configured so that it can only increment when the output of the AND gate 418 is TRUE. One of the inputs to the AND gate 418, moreover, is from the comparator 416, which itself receives inputs from the system time generator 414 and the retrieve time generator 410. If the current retrieve time from generator 410 is less than the system time from generator 414, then the comparator 416 outputs a TRUE signal via line 418b to the AND gate 418. However, before the AND gate 418 will output a TRUE signal and thereby allow the retrieve time generator 410 to increment, it must also receive a TRUE signal on its second input 418a. As indicated above, second input line 418a of AND gate 418 is coupled directly or indirectly to TCAM 406, which provides a TRUE signal only when there are no entries that match the current retrieve time. In other words, TRUE means that there are no entries in the TCAM 406 whose First Timestamp or Second Timestamp (depending on the presence of excess bandwidth) matches the current retrieve time.

If these two conditions are met, then the output of the AND gate 418 is TRUE and the retrieve generator 410 is allowed to increment. Significantly, the retrieve generator 410 is configured to increment at a higher rate than the system time generator 414. In particular, as described above, the clock signal from arrow 332 is subject to a divider circuit 420 before reaching the system time generator 414. No such divider circuit is utilized on the clock signal feeding the retrieve time generator 410. Thus, the retrieve time generator 410 increments or advances at a faster rate than the system time generator 414. Accordingly, the retrieve time, which is stopped while matching entries in first memory device 406 are processed, can quickly "catch-up" to the system time. It should be understood that the TCAM 406 is nonetheless searched for entries matching each new retrieve time as generated by retrieve time generator 410. That is, each time the retrieve time generator 410 is incremented to a new "value", that value is compared against the entries of TCAM 406.

In the preferred embodiment, the system time generator 414 is incremented once every 100 nsec due to the divider circuit 420, while the retrieve time generator 410 increments once every 10 nsec. By incrementing the retrieve generator 410 at a higher rate than the system time generator 414, the retrieve generator 410 can quickly catch-up to the system time specified by generator 414. This is important since, as described above, the retrieve time generator 410 is stopped while matching entries in the TCAM 406 are located and processed, and TCAM 406 is searched for every new value (i.e., every increment) of the retrieve time generator 410. Once the retrieve time generator 410 has caught up to the system time generator 414, the comparator 416 stops outputting a TRUE signal to AND gate 418 and the retrieve time generator 410 stops incrementing.

Those skilled in the art will recognize that other relationships besides 10:1 may possibly be used for the retrieve generator 410.

It should be further understood that for traffic shapers that are only configured to implement CBR traffic shaping, the selection circuit 314 and FIFO queues 316 can be omitted.

Figure 5:
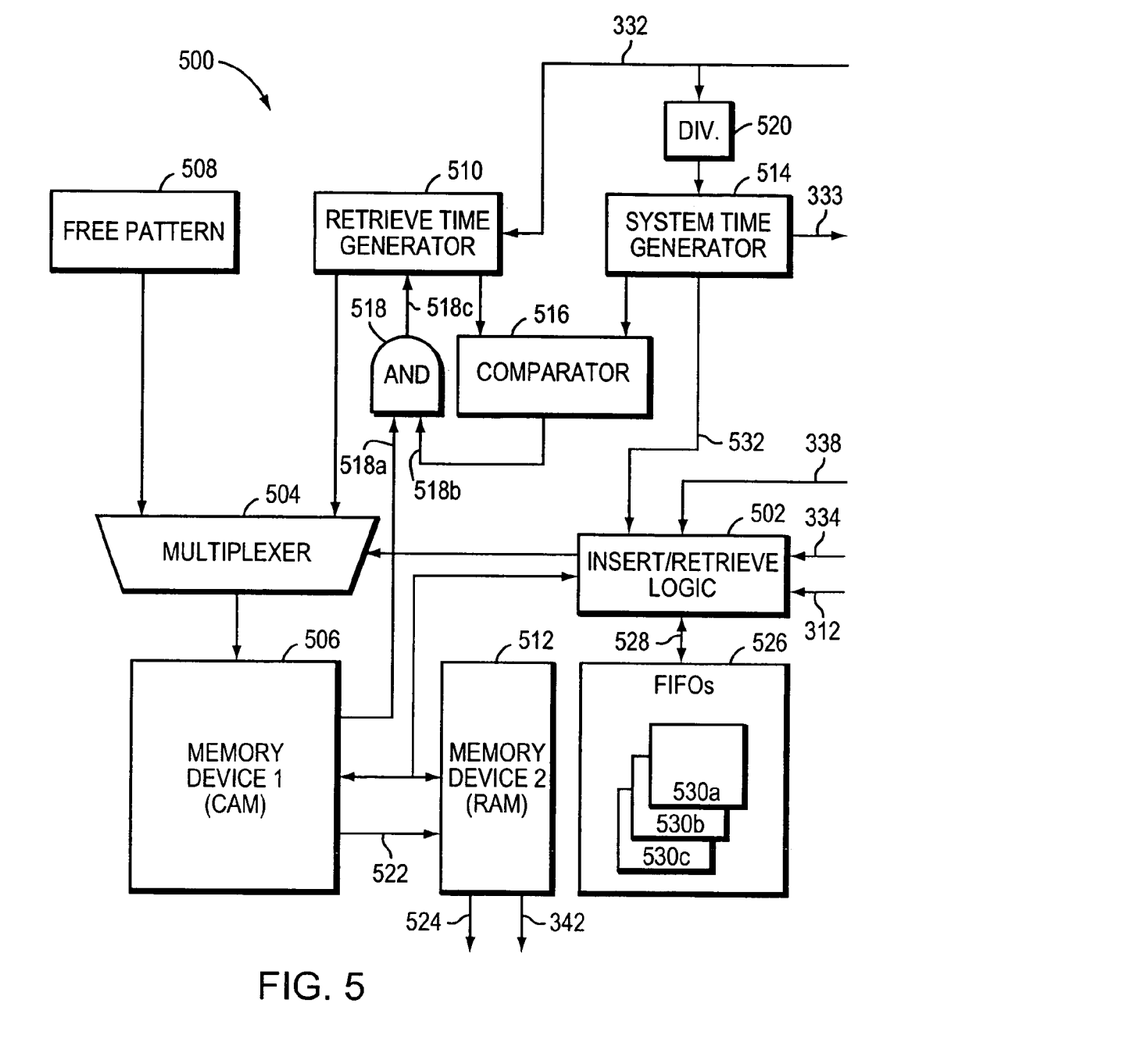
FIG. 5 is a functional block diagram of another embodiment of the time-searchable queue of the present invention.

FIG. 5 is a schematic drawing of another embodiment of a calendar queue 500 in accordance with the present invention. Calendar queue 500, like calendar queue 318 described above, includes insert/retrieve logic 502 which controls a multiplexer 504 having an output coupled to a first memory device (e.g., a TCAM) 506. Multiplexer 504 receives inputs from a free pattern data structure 508 and a retrieve time generator 510. The calendar queue 318 further includes a second memory device (e.g., RAM) 512, which is related to the first memory device 506, as well as a current time generator 514. The insert/retrieve logic 502, in addition to controlling the multiplexer 318, is further coupled to two memory devices 506, 512 for storing information therein, and also for retrieving information and outputs therefrom. The calendar queue 500 also includes a comparator 516 and an AND gate 518. The comparator 516 receives inputs from the retrieve time generator 510 and the current time generator 514. A first input 518a of AND gate 518 is coupled to the first memory device 506, while a second input 518b is coupled to an output of the comparator 516. An output 518c of the AND gate 518 is coupled to the retrieve time generator 510.

To improve performance, calendar queue 500 further includes a temporary data store 526 in which message pointers and start times may be accumulated (e.g., buffered) before being loaded into the TCAM 506 and RAM 512. In the preferred embodiment, the data store 526, which is coupled to the insert/retrieve logic 502 as shown by bi-directional arrow 528, comprises a plurality of first-in-first-out data structures (FIFOs) 530a–c. Each FIFO 530a–c, moreover, is associated with a transmission start time range. For example, FIFO 530a may be associated with a near transmission start time range, FIFO 530b with a mid transmission start time range and FIFO 530c with a far transmission start time range relative to the current time as determined by system time generator 514, which may also be coupled to the insert/retrieve logic 502 as shown by arrow 532. As message pointer and start time information is received by the insert/retrieve logic 502, via arrows 338 and 312, it is initially buffered in one of the FIFOs 530a–c.

The particular FIFO 530a–c selected by the insert/retrieve logic 502 for storing a given message and transmission start time is based on the value of the given start time. More specifically, when a message pointer and start time pair are received at calendar queue 500, logic 502 first compares the message start time to the current time from generator 514. If the message start time is close to the current time, then the message pointer and start time are stored in the near range FIFO 530a. If the start time is far away from the current time, then the message pointer and start time are stored in the far range FIFO 530c. If the start time falls somewhere in between, then the message pointer and start time are stored in the mid range FIFO 530b. Thus, each particular FIFO 530a–c contains message pointers and start times that fall within the same rough time range. However, since the message pointers and start times are stored in the respective FIFOs 530a–c as they are received by calendar queue 500, they are not time ordered within the individual FIFOs 530a–c.

In this embodiment, the insert/retrieve logic 502 periodically takes the message pointers and transmission start times from the near range FIFO 530a and copies them into the TCAM 506 and RAM 512 in a similar manner as described above in connection with calendar queue 318. That is, logic 502 switches multiplexer 504 to search TCAM 506 for entries matching the free pattern 508. As free entries are located, the start times from the near FIFO 530a are copied therein while the message pointers are copied into corresponding entries in the RAM 512. By moving the contents of the near range FIFO 530a into TCAM 506 and RAM 512, the start times are placed in time order. After moving the contents of the near range FIFO 530a into the TCAM 506 and RAM 512, logic 502 now treats FIFO 530b as the "new" near range FIFO, FIFO 530c as the "new" mid range FIFO, and FIFO 530a as the "new" far range FIFO for purposes of storing new message pointers and start times that it receives.

The contents of TCAM 506 are searched, and start times located and retrieved, in a similar manner as described above in connection with calendar queue 318.

It should be understood that calendar queue 500 may use more than three FIFO queues 530, and that other memory structures besides FIFOs may be advantageously utilized. Referring to FIG. 3, it should be further understood that the temporary data store 526 of FIG. 5 may be located in front of the calendar queue 318, and loaded with start times and message pointers by the ALU 304 and the selection circuit 314, rather than insert/retrieve logic 502.

Figure 6:
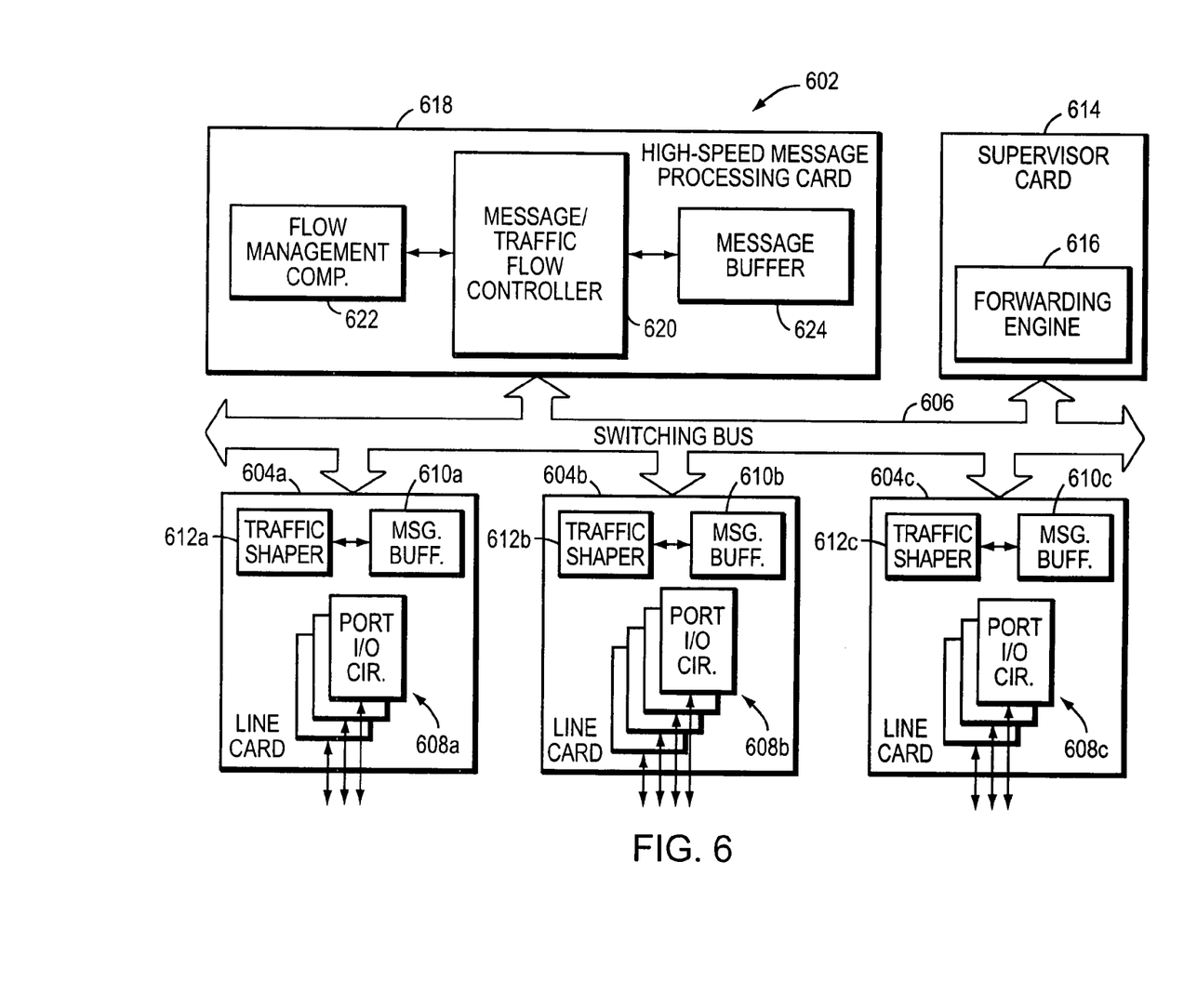
FIG. 6 is a partial functional block diagram of another intermediate network device having an alternative embodiment of the traffic shaper of the present invention.

FIG. 6 is a highly schematic, partial functional diagram of an intermediate network device 602 in which the traffic shaper functionality is distributed across the line cards. Device 602 includes a plurality of line cards 604a–604c that are coupled to a high-performance switching bus 606. Each line card 604a–604c, moreover, has a plurality of corresponding port input/output (I/O) circuits 608a–608c, respectively, that are each coupled to respective ports (not shown), thereby connecting device 602 to the entities of the corresponding network (not shown). Each line card 604a–c further includes its own message buffer 610a–c and its own traffic shaper module 612a–c. As described above, the port I/O circuits 608 cooperate with their respective line cards 604 to efficiently transmit data (e.g., network messages) to, and receive data from, the switching bus 606. Also coupled to switching bus 604 are one or more supervisor cards, such as supervisor card 614, which may include a forwarding engine 616, and a high-speed message processing card 618. Message processing card 618 includes a message/traffic flow controller 620, a flow management component 622 and a message buffer 624. Preferably, the supervisor and message processing cards 614, 618 are merged onto a single card or board so that messages need only cross bus 606 once.

Each traffic shaper module 612a–c located on the line cards 604a–c is preferably configured and arranged like traffic shaper 218 described above and generally operates in a similar manner.

Operation of this embodiment of the invention preferably proceeds as follows. Message packets from a web server, such as web server 102 (FIG. 1), that are received by device 602 are captured by a respective port I/O circuit, e.g., I/O circuit 608a. The respective line card, e.g., line card 604a, copies the packets into its message buffer 610a and also drives them onto the high-speed bus 606. From here, the packets are received by the other line cards 604b and 604c, and copied into their message buffers 610b and 610c, respectively. The packets are also received at the message processing card 618 and stored at its message buffer 624. At the supervisor card, the 614, the forwarding engine 616 examines one or more fields of the packet (e.g., source and destination IP addresses, source and destination TCP/UDP port numbers, transport protocol, etc.) and not only determines whether the packets should be shaped, but also identifies the line card 604 and the port I/O circuit 608 pair from which the packets should be forwarded.

The forwarding engine 616 notifies the respective line card/port I/O circuit pair that is to forward the packet, e.g., line 604c, and, assuming the packet should be shaped, the forwarding engine 616 also determines the corresponding SID and provides it along with other packet-related information to line card 604c. The other line cards, e.g., cards 604a and 604b, simply discard the packet from their message buffers 610a and 610b. At line card 604c, the traffic shaper 612c computes a transmission start time(s) for the packet based on the received SID and loads this information in its forwarding trigger (not shown) along with the message pointer information (i.e., the location of this packet in buffer 610c). When the calculated transmission start time is reached, the traffic shaper 610c notifies the line card 604c which retrieves the packet from the message buffer 610c and forwards it from the port I/O circuit previously identified by the forwarding engine 616. In this embodiment, packets traverse bus 606 only once, significantly increasing the packet handling speed of the device 602.

In yet another embodiment, forwarding engine 616, in addition to traffic shaper 612, may be distributed across one or more line cards 604 (e.g., de-centralized forwarding). That is, at least some of the line cards also have their own forwarding engines for making forwarding decisions.

The foregoing description has been directed to specific embodiments of this invention. It will be apparent, however, that other variations and modifications may be made to the described embodiments, with the attainment of some or all of their advantages. More specifically, pointers to other information, besides messages, may be provided to the traffic shaper 218, stored by the forwarding trigger mechanism 306 and searched in a time-dependent manner. For example, pointers to various transactions or events may be provided to the "traffic shaper" and processed (e.g., time-searched) at high speed. Therefore, it is the object of the appended claims to cover all such variations and modifications as come within the true spirit and scope of the invention.

What is claimed is:

1. A traffic shaper for shaping transmission of network messages, comprising:
    a system time generator to generate a system time;
    an arithmetic logic unit (ALU) to compute a transmission start time for a network message in response to the system time;
    a retrieve time generator to increment a retrieve time at a rate faster than the system time;
    a queue to store the network message and the transmission start time; and
    a forwarding trigger to transmit the network message stored in the queue when the retrieve time matches the transmission start time of the message.

2. The traffic shaper of claim 1 wherein the retrieve time generator is blocked from incrementing while matches with the first transmission time are being determined.

3. The traffic shaper of claim 1 wherein the queue further comprises:
    a first memory device to store a plurality of entries, each entry configured to store the first transmission start time of a network message.

4. The traffic shaper of claim 3 wherein the queue further comprises:
a second memory device interconnected to the first memory device, the second memory device to store message location information corresponding to each first transmission start time in the first memory device.

5. The traffic shaper of claim 3 wherein the first memory device is a content addressable memory (CAM) searchable by the retrieve time.

6. The traffic shaper of claim 3 further comprising:
insert/retrieve logic coupled to the first memory device, the inset/retrieve logic configured to operate in either an insert mode or a retrieve mode such that, in insert mode, the inset/retrieve logic searches the first memory device for a free entry in which to store a transmission start time, and in retrieve mode the insert/retrieve logic searches the first memory device for a transmission start time that matches the retrieve time.

7. The traffic shaper of claim 1 further comprising:
a transmit trigger-signal issued by the forwarding trigger in response to detecting the first transmission start time matching the retrieve time, the transmit trigger-signal issued to a message buffer to indicate a selected message should be forwarded.

8. The traffic shaper of claim 1 further comprising:
a second transmission start time, computed by the ALU, for a network message, the second transmission start time earlier in time than the first transmission start time; and
wherein the forwarding trigger is to transmit the network message stored in the queue when excess bandwidth is detected and the retrieve time matches the second transmission start time of the message.

9. A traffic shaper for shaping transmission of network messages, comprising:
a retrieve time generator to generate retrieve time;
a system generator to generate a system time, wherein the retrieve time is incremented at a faster rate than the system time;
an arithmetic logic unit (ALU) to compute a first and a second transmission start times for a network message in response to the system time, the first transmission start time representing a guaranteed transmission start time for the network message, the second transmission start time representing an excess bandwidth transmission start time;
a message/traffic flow controller interconnected to the ALU to inform the ALU when excess bandwidth exists for sending network messages; and
a forwarding trigger to transmit the network message stored in the queue when either the retrieve time matches the first transmission start time, or the retrieve time matches the second transmission start time and excess bandwidth exists.

10. A method for shaping transmission of network messages, comprising:
generating a clock signal;
generating a system time, the system time responsive to the clock signal;
computing a first transmission start time for a network message in response to the system time;
generating a retrieve time responsive to the clock signal, the retrieve time incremented at a rate faster than the system time;
storing a network message in a queue; and
transmitting the network message stored in the queue when the retrieve time matches the first transmission start time of the message.

11. The method for shaping transmission of network messages of claim 10 further comprising:
blocking the retrieve time from incrementing while matches between the retrieve time and the first transmission times are being determined.

12. The method for shaping transmission of network messages of claim 10 wherein the step of storing a network message further comprises:
storing the first transmission start time for the network message as an entry in a first memory device.

13. The method for shaping transmission of network messages of claim 12 wherein the step of storing a network message further comprises:
storing message location information corresponding to the network message in a second memory device interconnected to the first memory device.

14. The method for shaping transmission of network messages of claim 12 wherein the first memory device is a content addressable memory (CAM) searchable by the retrieve time.

15. The method for shaping transmission of network messages of claim 12 comprising:
selecting to operate in either an insert mode or a retrieve mode such that, in insert mode, an inset/retrieve logic searches the first memory device for a free entry in which to store a transmission start time, and in retrieve mode the insert/retrieve logic searches the first memory device for a transmission start time that match the retrieve time.

16. The method for shaping transmission of network messages of claim 10 comprising:
issuing a transmit trigger-signal to a message buffer upon detecting the first transmission start time matching the retrieve time to indicate a selected message should be forwarded.

17. The method for shaping transmission of network messages of claim 10 comprising:
computing a second transmission start time, the second transmission start time earlier in time than the first transmission start time; and
transmitting the network message when the retrieve time matches the second transmission start time of the message if excess bandwidth is detected.

18. A method for shaping transmission of network messages, comprising:
generating a retrieve time;
generating a system time, wherein the retrieve time is incremented at a faster rate than the system time;
computing a first and a second transmission start time for a network message in response to the system time, the first transmission start time representing a guaranteed transmission start time for the network message, the second transmission start time representing an excess bandwidth transmission start time;
determining when excess bandwidth exists for sending network messages; and
transmitting the network message stored in the queue when the retrieve time matches either the first transmission start time of the message or the retrieve time matches the second transmission start time of the message and excess bandwidth is detected.

19. A traffic shaper for shaping transmission of network messages, comprising:
means for generating a clock signal;
means for generating a system time, the system time responsive to the clock signal;

means for computing a first transmission start times for a network message in response to the system time;
means for generating a retrieve time responsive to the clock signal, the retrieve time incremented at a faster rate than the system time;
means for storing a network message; and
means for transmitting the network message stored when the retrieve time matches the first transmission start time of the message.

20. A traffic shaper for shaping transmission of network messages, comprising:
means for generating a retrieve time;
means for generating a system time, wherein the retrieve time is incremented at a faster rate than the system time;
means for computing a first and a second transmission start time for a network message in response to the system time, the first transmission start time representing a guaranteed transmission start time for the network message, the second transmission start time representing an excess bandwidth transmission start time;
means for determining when excess bandwidth exists for sending network messages; and
means for transmitting the network message stored in the queue when the retrieve time matches either the first transmission start time of the message or the retrieve time matches the second transmission start time of the message and excess bandwidth is detected.

* * * * *